(12) United States Patent
Pate et al.

(10) Patent No.: US 9,845,859 B2
(45) Date of Patent: Dec. 19, 2017

(54) MOVER APPARATUS INSTALLED AFTERMARKET OR OEM FOR PIVOTING A CEMENT CHUTE AND METHOD

(71) Applicant: Ezeproducts, LLC, Tuscaloosa, AL (US)

(72) Inventors: Luther Stan Pate, Tuscaloosa, AL (US); Ingemar Håuansson, Månsarp (SE)

(73) Assignee: EZProducts, LLC, Tuscaloosa, AL (US)

( * ) Notice: Subject to any disclaimer, the term of this patent is extended or adjusted under 35 U.S.C. 154(b) by 397 days.

(21) Appl. No.: 14/612,249

(22) Filed: Feb. 2, 2015

(65) Prior Publication Data

US 2016/0223062 A1    Aug. 4, 2016

(51) Int. Cl.
| | | |
|---|---|---|
| *B28C 5/42* | (2006.01) | |
| *B28C 7/16* | (2006.01) | |
| *F16H 55/17* | (2006.01) | |
| *F16H 19/04* | (2006.01) | |
| *B65G 11/12* | (2006.01) | |
| *F16H 55/26* | (2006.01) | |

(52) U.S. Cl.
CPC .......... *F16H 55/17* (2013.01); *B28C 5/4248* (2013.01); *B28C 7/168* (2013.01); *B65G 11/12* (2013.01); *F16H 19/04* (2013.01); *F16H 55/26* (2013.01)

(58) Field of Classification Search
CPC ... B28C 5/4203; B28C 5/4244; B28C 5/4248; B28C 5/4251; B28C 7/168; B08B 9/00; B08B 17/025; F16H 55/17; F16H 19/04; F16H 55/26; B65G 11/00–11/206

USPC ............... 366/53–63, 68, 187; 193/10, 23
See application file for complete search history.

(56) References Cited

U.S. PATENT DOCUMENTS

| | | | | |
|---|---|---|---|---|
| 3,410,538 A | * | 11/1968 | Potter | B28C 5/4248 366/68 |
| 3,633,719 A | * | 1/1972 | Lynch | B28C 5/4248 193/10 |
| 3,726,029 A | | 4/1973 | Deen | |
| 4,190,144 A | | 2/1980 | Lybbert | |
| 4,273,231 A | * | 6/1981 | Hodneland | B28C 5/4248 193/10 |
| 4,392,563 A | * | 7/1983 | Holman | B28C 5/4244 193/10 |

(Continued)

FOREIGN PATENT DOCUMENTS

WO    WO 2016126706 A1 *  8/2016  ............. F16H 19/04

OTHER PUBLICATIONS

PCT/US16/16173, International Search Report, dated Jul. 15, 2016.
PCT/US16/16173, Written Opinion, dated Jul. 15, 2016.

*Primary Examiner* — Charles Cooley
(74) *Attorney, Agent, or Firm* — Baker Donelson (57) ABSTRACT

A mover apparatus having a pinion rigidly attached to a pivot mount connected to a cement chute of a cement mixer and engaged by rack of a mover assembly biased by a guide, which mover assembly, being selectively operated, moves the rack longitudinally between a retracted position and an extended position to impart rotational movement to the pivot mount for swinging the cement chute in an arc relative to the cement mixer for orienting the cement chute to a selected location for discharge of cement. A method of installing a mover apparatus as an aftermarket or OEM structure is disclosed.

20 Claims, 6 Drawing Sheets

(56) References Cited

U.S. PATENT DOCUMENTS

| | | | | |
|---|---|---|---|---|
| 4,797,056 A * | 1/1989 | Gerold | ................ | B65G 11/186 |
| | | | | 188/72.4 |
| 5,178,252 A | 1/1993 | Smith | | |
| 6,186,304 B1 | 2/2001 | Håkansson | | |
| 6,578,694 B2 * | 6/2003 | Harris | ................... | B65G 11/126 |
| | | | | 193/16 |
| 7,401,969 B2 * | 7/2008 | Johnson | ................ | B65G 11/18 |
| | | | | 193/10 |
| 8,201,430 B1 | 6/2012 | Frear | | |
| 8,967,358 B2 * | 3/2015 | Shimizu | .................... | B28C 5/42 |
| | | | | 193/22 |
| 2005/0043136 A1 | 2/2005 | Colter | | |
| 2007/0008814 A1 * | 1/2007 | Johnson | ................ | B65G 11/18 |
| | | | | 366/68 |
| 2014/0356119 A1 * | 12/2014 | Kasahara | .............. | B28C 5/4251 |
| | | | | 414/523 |
| 2016/0223062 A1 * | 8/2016 | Pate | ........................ | F16H 19/04 |
| 2017/0144714 A1 * | 5/2017 | Dupay | ............... | B62D 53/0814 |

\* cited by examiner

MOVER APPARATUS INSTALLED AFTERMARKET OR OEM FOR PIVOTING A CEMENT CHUTE AND METHOD

TECHNICAL FIELD

The present invention relates to cement mixers having extendable horizontally movable chutes for directing the flow of cement from the cement mixer to a work location at a job site. More particularly, the present invention relates to apparatus and methods for pivoting a cement chute mounted to a discharge end of a cement mixer through a horizontal arc to a selected position relative to the cement mixer for discharging the cement mixture to a delivery location for cement construction at a job site.

BACKGROUND OF THE INVENTION

Mixing and pouring cement mixtures for cement construction at job sites involves significant manual labor. Aspects of the mixing and pouring work however may be assisted by machinery and equipment. This machinery and equipment includes motorized mixing vessels, cement mixer trucks that carry a supply of cement mixture to a job site, and motorized bins that move the cement mixture from the truck or mixing vessel to the work location for concrete construction at the job site. Other equipment such as shovels, straightedges, trowels, and floats, are used during the manual labor involved in placing and finishing the wet concrete discharged from the cement chute.

Cement mixers receive cement, sand, water, and other components for mixing to form a cementatious mixture. Cement mixer trucks receive and hold the cementatious mixture for delivery from a cement plant, for example, to a job site for cement construction. The cement mixer includes a discharge port that selectively allows the cementatious mixture to flow into the cement chute. The cement chute attaches to the discharge end of the cement mixer truck as an elongated trough or channel along which the cementatious mixture flows to a selected work location preferably near the end of the chute to minimize the labor in placing the mixture. Cement chutes typically have one or more extendable members, such as a trough member that hingedly attaches to another trough member and unfolds to form the elongated cement chute or telescopically extendable members. A connector connects between a rotatable shaft or pole and the cement chute as a pivot mount, so that the cement chute may be swung in a horizontal arc to position the end of the chute selectively at the work location at the job site for cement construction. The cement received in the cement chute flows downwardly and off the end of the cement chute.

Some cement mixers have mechanisms for moving the cement chute in a horizontal and a vertical direction. However, with many cement mixers, such as cement mixer trucks, the horizontal arcuate pivoting or swinging movement is accomplished by workers who manually and laboriously push or pull on the extended cement chute. A pin positioned in a selected hole in a pivot plate acts as a brake to keep the cement chute from swinging during discharge as may occur on unleveled uneven ground that is not uncommon at construction job sites. Manual movement requires the work personnel to be in close proximity to the cement chute. The cementatious mixture typically is heavy and the cement chute may be difficult to swing and properly position for discharge of the flowing cementatious mixture at a work location.

Accordingly, there is a need in the art for an improved aftermarket or OEM mover apparatus that readily installs to cement mixers for mechanically pivoting the cement chute in a limited arc for positioning the cement chute for discharge of the flowing cementatious mixture at a selected location while braking the cement chute from movement on uneven ground. It is to such that the present invention is directed.

BRIEF SUMMARY OF THE INVENTION

The present invention meets the need in the art by providing a mover apparatus for mechanically swinging in a left to right arc a cement chute pivotably mounted at a discharge end of a cement mixer, comprising a pinion comprising at least a pair of arcuate members that each define a plurality of teeth on a face thereof and each arcuate member having respective opposing ends for attaching as a circular ring to a pivotable member that connects to the cement chute of the cement mixer, the arcuate members disposed with a respective end of a first one of the pair of arcuate members abutting a respective end of a second one of the pair of arcuate members, and a mover assembly comprising a cylinder for attaching rigidly to the cement mixer and having an extendable shaft for moving between a retracted position and an extended position and an elongated rack that defines a plurality of teeth on a working face and attached at one end to the extendable shaft. A guide for mounting rigidly to a support for the pivotable member to bias the teeth on the working face into engagement with the teeth of the pinion. An operation device for selectively operating the cylinder to move the extendable shaft between the retracted and the extended position and thereby move the rack longitudinally relative to the pinion. The pinion engaged to the rack, rotates in response to operation of the cylinder moving the elongated rack between the retracted and extended positions, to swing the cement chute in an arc relative to the cement mixer.

In another aspect, the present invention provides a method of retrofitting a manually swung cement chute of a cement mixer with a mechanical mover assembly, comprising the steps of:

(a) rigidly attaching an arcuate pinion member having a plurality of teeth to a pivot mount that connects to the cement chute of the cement mixer, the arcuate pinion member defined by a first arcuate member and a second arcuate member disposed with respective ends in abutting relation;

(b) engaging a rack having a plurality of teeth to the arcuate pinion member, which rack attaches to a power device that being operated moves the rack longitudinally between an extended position and a retracted position and thereby imparting rotational movement to the arcuate pinion member;

(c) securing the power device to a support on the cement mixer; and (d) connecting the power device to a power source and to an operational controller for selectively moving the rack, wherein the pivot mount rotates upon longitudinal movement of the rack during selective operation by the operational controller.

In another aspect, the present invention provides a mover apparatus for swinging a cement chute pivotably mounted at a discharge end of a cement mixer, comprising a pinion defining a plurality of teeth on a face of the pinion, the pinion for attaching to a pivotable member that connects to the cement chute of the cement mixer and a mover assembly comprising a cylinder for attaching rigidly to the cement mixer and having an extendable shaft for moving between a retracted position and an extended position and an elongated rack that defines a plurality of teeth on a working face and attached at one end to the extendable shaft. A guide for mounting rigidly to a support for the pivotable member for biasing the teeth on the working face in engagement with the teeth of the pinion. The guide comprises a U-channel member that slidingly receives the elongated rack for longitudinal movement during operation of the cylinder; a backer plate that abuts a back face of the U-channel member; a flange extending normal to the backer plate for rigidly attaching to the support for the pivotable member; and connectors that extend through the backer plate and against the U-channel member to bias the teeth of the elongated rack in engagement to the teeth of the pinion; and an operation device for operating the cylinder to move the extendable shaft between the retracted and the extended positions selectively. The pinion being engaged to the elongated rack, rotates in response to operation of the cylinder to move between the retracted and extended positions, to swing the cement chute in an arc relative to the cement mixer.

In another aspect, the present invention provides a mover apparatus for swinging a cement chute pivotably mounted at a discharge end of a cement mixer, comprising a support housing defining a slot in a sidewall and for holding a rotatable shaft for connecting to a pivotable member that connects to the cement chute of the cement mixer. A pinion defining a plurality of teeth on a face of the pinion, the pinion for attaching to the rotatable shaft. A mover assembly comprising a cylinder for attaching rigidly to the cement mixer and having an extendable shaft for moving between a retracted position and an extended position and an elongated rack that defines a plurality of teeth on a working face and attached at one end to the extendable shaft, the elongated rack received through the slot inwardly of the support housing for engaging the pinion. A guide for mounting rigidly to a support for biasing the teeth on the working face in engagement with the teeth of the pinion. An operation device for operating the cylinder to move the extendable shaft between the retracted and the extended positions selectively. The pinion being engaged to the elongated rack, rotates in response to operation of the cylinder to move the elongated rack between the retracted and extended positions, to swing the cement chute in an arc relative to the cement mixer.

In yet another aspect, the present invention provides a mover apparatus for swinging a cement chute pivotably mounted at a discharge end of a cement mixer, comprising a pinion comprising at least a pair of arcuate members that each define a plurality of teeth on a face thereof for attaching to a pivotable member that connects to the cement chute of the cement mixer with a first end of one of the pair of arcuate members abutting a first end of a second one of the pair of arcuate members. A mover assembly comprising a cylinder for attaching rigidly to the cement mixer and having an extendable shaft for moving between a retracted position and an extended position and an elongated rack that defines a plurality of teeth on a working face and attached at one end to the extendable shaft. A guide for mounting rigidly to a support for the pivotable member for biasing the teeth on the working face in engagement with the teeth of the pinion. An operation device for operating the cylinder to move the extendable shaft between the retracted and the extended positions selectively. The pinion being engaged to the elongated rack, rotates in response to operation of the cylinder to move the elongated rack between the retracted and extended positions, to swing the cement chute in an arc relative to the cement mixer.

Objects, advantages and features of the present invention will become apparent from a reading of the following detailed description of the invention and claims in view of the appended drawings.

DETAILED DESCRIPTION

Figure 1:
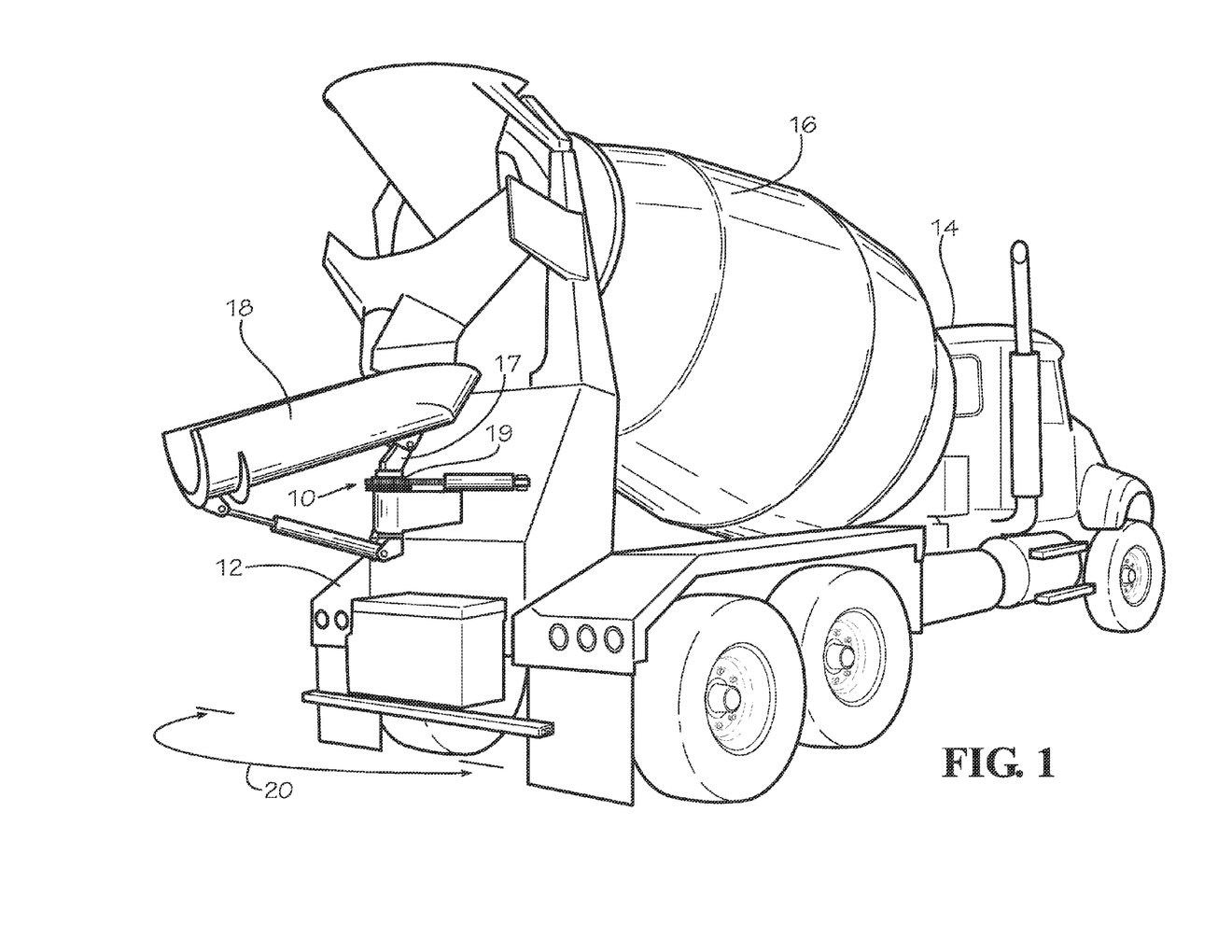
FIG. 1 illustrates in perspective view a cement mixer truck equipped with a mover apparatus in accordance with the present invention operable for selective swinging positioning of a cement chute mounted at a discharge end of the cement mixer truck for discharge of a cement mixture to a work location at a job site.

Referring now in more detail to the drawings in which like parts have like identifiers, FIG. 1 illustrates in perspective view a mover apparatus 10 attached at a discharge end 12 of a cement mixer truck 14. The cement mixer truck 14 holds a rotatable vessel 16 for mixing a supply of a cementatious mixture. A cement chute 18 extends from the discharge end 12. The cement chute 18 provides a trough or channel for carrying some of the cementatious mixture from the vessel 16 to a selected location for concrete construction at a job site. The mover apparatus 10 connects to a pivot mount 17 for the cement chute 18. The mover apparatus may connect as an original equipment manufacturer (OEM) installed structure or as an aftermarket structure. The pivot mount 17 attaches to an end of a rotatable shaft 80 or pole held in bearings secured in a support 19. The pivot mount 17 provides for rotation in order for the cement chute 18 to swing from side to side 180° at the discharge end 12 of the cement mixer 14. Operating the mover apparatus 10 as discussed below swings the cement chute 18 though an arc generally 20 relative to the cement mixer truck 14, for selective orientation of the cement chute 18 and the positioning of its distal end for discharge of the cementatious mixture at a work location.

Figure 2:
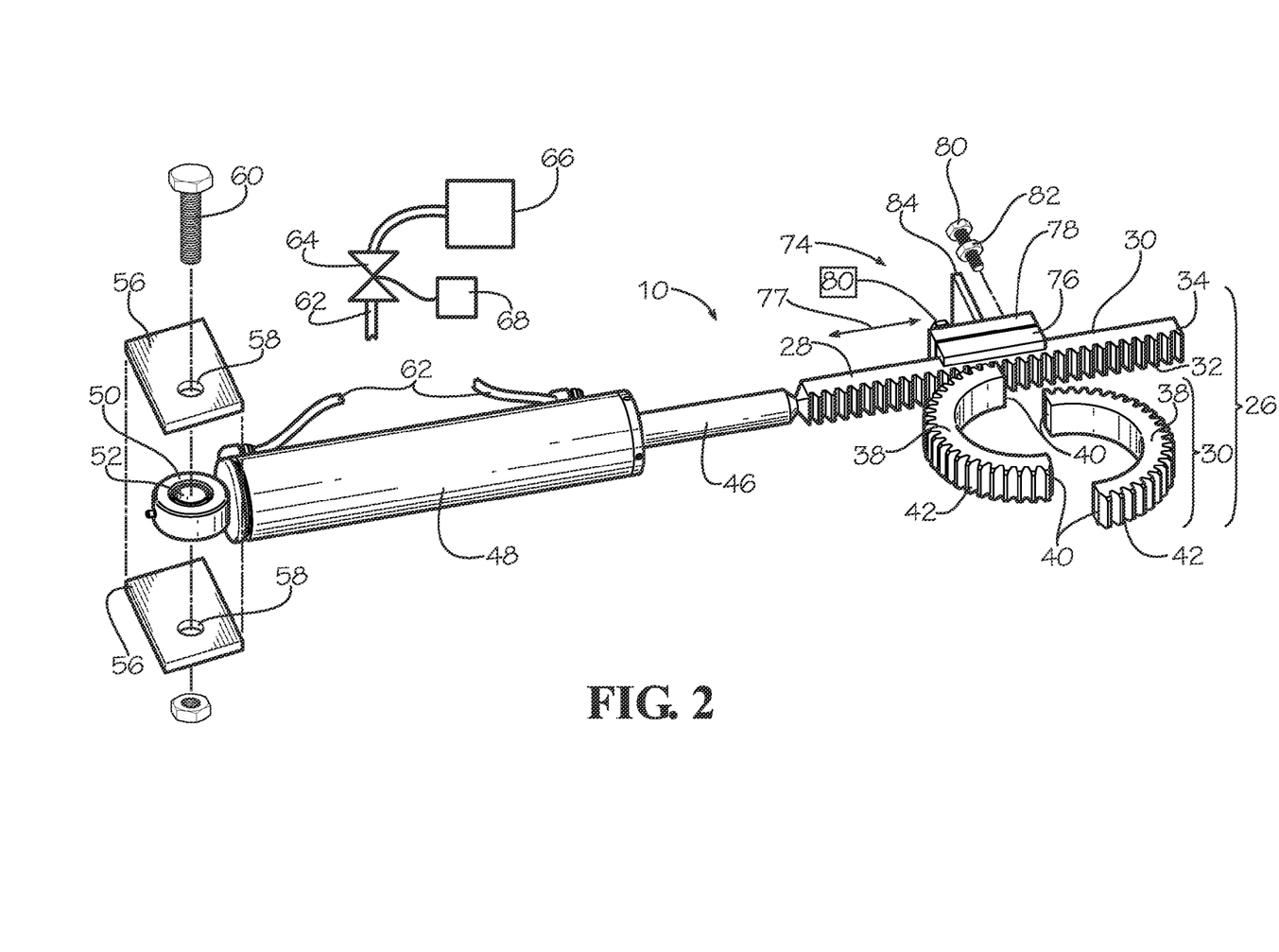
FIG. 2 illustrates in detailed perspective view the mover apparatus illustrated in FIG. 1.

FIG. 2 illustrates in detailed perspective view the mover apparatus 10 illustrated in FIG. 1. The mover apparatus 10 comprises a rack and pinion assembly generally 26 having an elongate rack 28 and a pinion 30. The rack 28 comprises an elongated straight member or cog bar that defines a plurality of teeth 32 (or cogs) on a working face 34. An opposed back face 36 defines a sliding surface. The pinion 30, also may be recognized as a cog wheel, a gear wheel, or a gear ring, in comprises the illustrated embodiment a pair of semi-circular members 37. The members 37 are depicted exploded apart in opposing relation. Each member 37 has respective opposing ends 38. The ends 38 abut a respective end of the opposing member 37 for defining the circular ring or pinion 30 when attached to the pivot mount 17. Each member 37 defines a plurality of teeth 40 or cogs. The teeth 32 of the rack 28 engage the teeth 40 of the pinion 30. Longitudinal movement of the rack 28 induces rotational movement of the pinion 30.

The rack 28 attaches to a shaft 46 of a hydraulic cylinder 48. The hydraulic cylinder 48 attaches rigidly to the cement mixer 12. In the illustrated embodiment, the cylinder 48 defines a transverse cylindrical portion 50 at one end. The cylindrical portion is disposed transverse to a longitudinal axis of the cylinder 48. The cylindrical portion 50 defines a passageway 52. The cylindrical portion 50 seats between a pair of opposing flanges 56 shown exploded away from the cylindrical portion. The flanges 56 rigidly attach to a structural portion generally 57 of the cement mixer, for example, lateral of the support 19 as shown in the illustrated embodiment. Each flange 56 defines an opening 58 that aligns with the passageway 52 when the cylindrical portion 50 seats between the flanges. A fastener 60, such as a threaded bolt and nut, extends through the opening 58 and passageway 52 to secure the hydraulic cylinder 48 to the cement truck. In an alternate embodiment, the hydraulic cylinder 48 includes a mounting bracket proximate the end from which the shaft 46 extends. The mounting bracket enables the hydraulic cylinder 48 to rigidly connect to the support 19, and leaving the distal end of the hydraulic cylinder free.

As schematically depicted, the hydraulic cylinder 48 connects conventionally with hydraulic hoses 62 through a valve 64 to a pressurized supply 66 of hydraulic fluid. A controller 68 operates the valve 64 for controlling the operation of the hydraulic cylinder 48 for selectively extending the shaft 46 and retracting the shaft, and thereby moving the rack 28 longitudinally.

A guide assembly generally 74 rigidly attaches to the support 19. The guide assembly 74 biases the teeth 32 of the rack 28 into operational engagement with the teeth 40 of the pinion 30. The guide assembly 74 includes a U-channel member 76 that slidingly receives the rack 28 for longitudinal movement as indicated by the arrow 77 during operation of the cylinder 48. The U-channel member 76 may be formed of a plastic or other low-friction wearable material, which U-channel member may be replaced after extended periods of use of the mover apparatus. A backer plate 78 abuts a back face of the U-channel member 76 and defines a pair of spaced-apart threaded openings that receive a respective bolt 80 having a lock nut 82. The bolts 80 extend though the backer plate 78 and bear pressingly against the U-channel member 76. The lock nut 82 tightens against the backer plate to secure the bolts 80 with the leading end of each in bearing abutment against the U-channel member 76. The U-channel member includes a bearing plate for the bolts 80 to press against. For example the back of the U-channel member may define spaced apart recesses that receive a metal disc or washer on which the bolts 80 press. A flange 84 extends from the backer plate 78. The flange 84 rigidly attaches to the support 19, such as welding a lower edge to the support.

Figure 3:
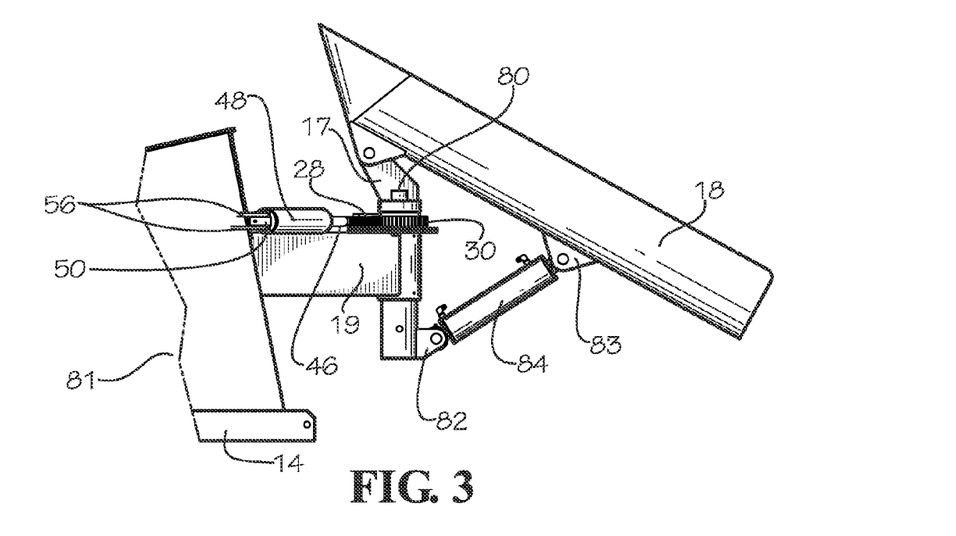
FIG. 3 illustrates in detailed side view the mover apparatus attached to the cement mixer illustrated in FIG. 1.

FIG. 3 illustrates in detailed side view the mover apparatus 10 attached to a pedestal 81 of the cement mixer 14 illustrated in FIG. 1. The support 19 holds the rotatable shaft 80 in bearings for rotational movement of the pivot mount 17 for the cement chute 18. The pivot mount 17 attaches to a pivot plate 79 (best shown in FIG. 4) that attaches to the shaft 80. A pair of flanges 82 attach to a housing at a lower end of the shaft 80. A hydraulic cylinder 84 connects between the flanges 82 and flanges 83 on the cement chute 18. The hydraulic cylinder 84 attaches with a pin or fastener that extends through aligned holes of the flanges 82 and a passageway of the hydraulic cylinder 84. The distal end of the extendable shaft of the hydraulic cylinder 84 pivotably attaches to the flanges 83 extending from the cement chute 18. Hydraulic hoses (not illustrated) connect through a valve to a supply of hydraulic fluid. A controller selectively operates the hydraulic cylinder 84. The cement chute 18 moves up and down in response to extension and retraction of the shaft during operation of the hydraulic cylinder 84.

Figure 4:
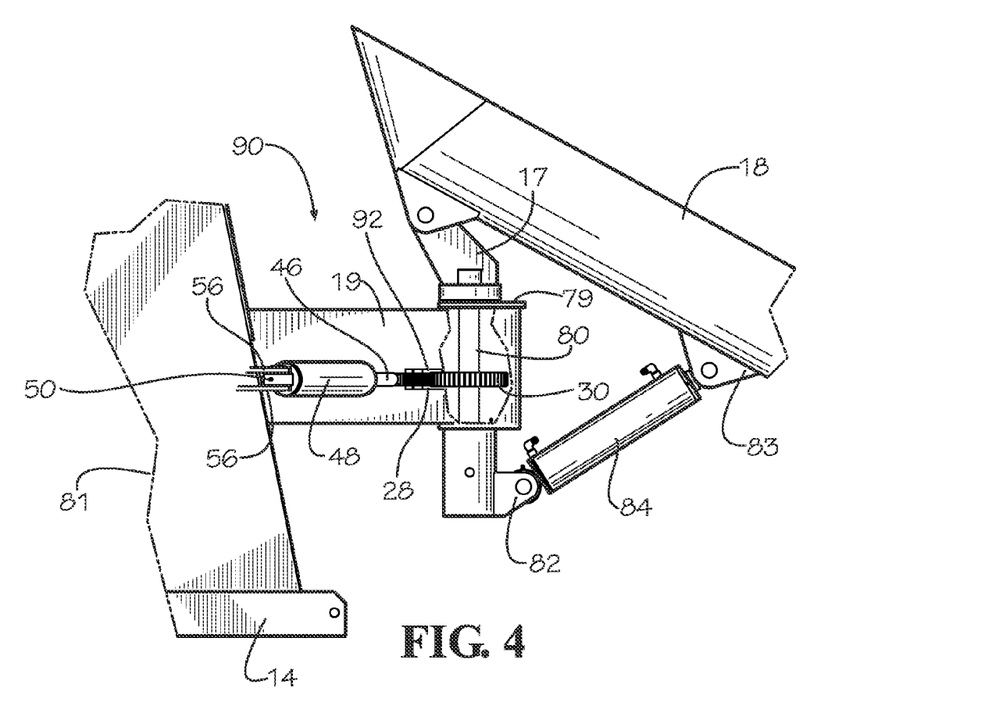
FIG. 4 illustrates in side detailed view an alternate embodiment of the mover apparatus installed on a pedestal of a cement mixer.

FIG. 4 illustrates in side detailed view an alternate embodiment generally 90 of the mover apparatus 10 installed on a cement mixer 14. The support 19 in this embodiment defines a slot 92. The shaft 46 passes through the slot 92 inwardly of the support 19. The pinion 30 attaches to the shaft 80 shown in partial cut-away view. The guide assembly 74 mounts on a plate inwardly of the support 19 (not illustrated in FIG. 4) and the U-channel 76 receives the straight rack 28 that the guide assembly biases into engagement with the pinion 30. The at least partially enclosed support 19 provides some protection from dirt and debris clogging the rack 28 and the pinion 30. In an alternate embodiment, the pinion 30 mounts to a lower portion of the shaft 80.

With reference to FIGS. 2 and 3, the semi-circular members 38 readily rigidly attach to the pivot mount 17 by welding. This is accomplished by positioning a first one of the members 38 around the lower portion of the pivot mount 17 and tack welding the member in place. A second one of the members 38 positions in opposing relation to the first member 38 with the opposing respective ends 38 in abutting relation. The first and second members 38 rigidly secure to the pivot mount 17 by welding. The use of the pair of members 38 to define the pinion enables convenient aftermarket installation of the mover apparatus 10 on a cement mixer that has a manually swung cement chute without having to dissemble the pivot mount 17 from engagement with the support 19. Further, the mover apparatus 10 also readily installs on OEM cement mixers during manufacturing processing.

Figure 5A:
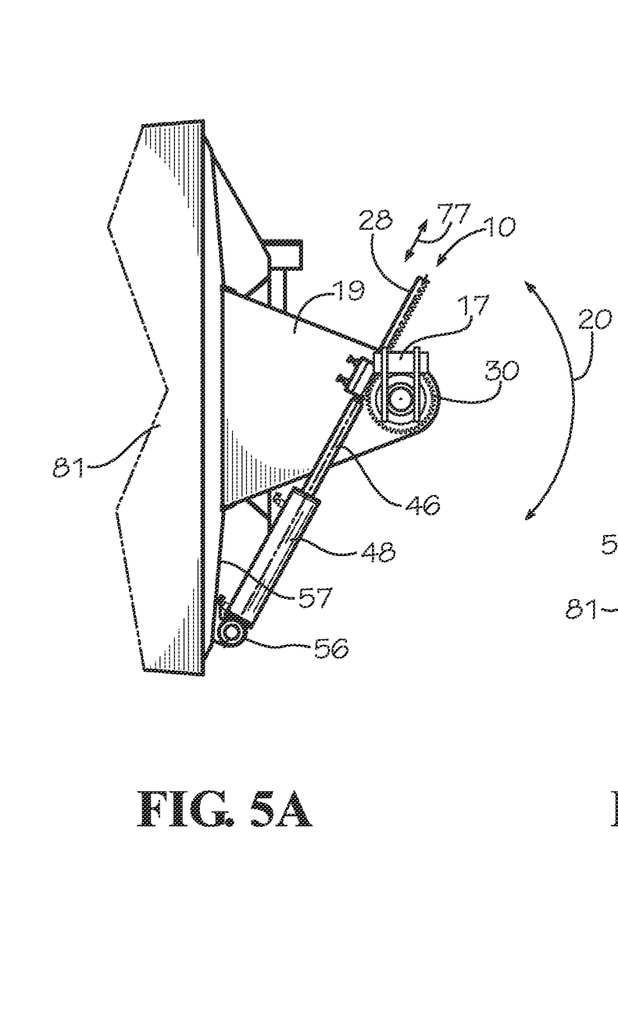
FIG. 5A illustrates a detailed top plan view of the mover apparatus in an extended position for orienting the cement chute in a first angled position relative to the cement mixer as illustrated in FIG. 5B.
Figure 5B:
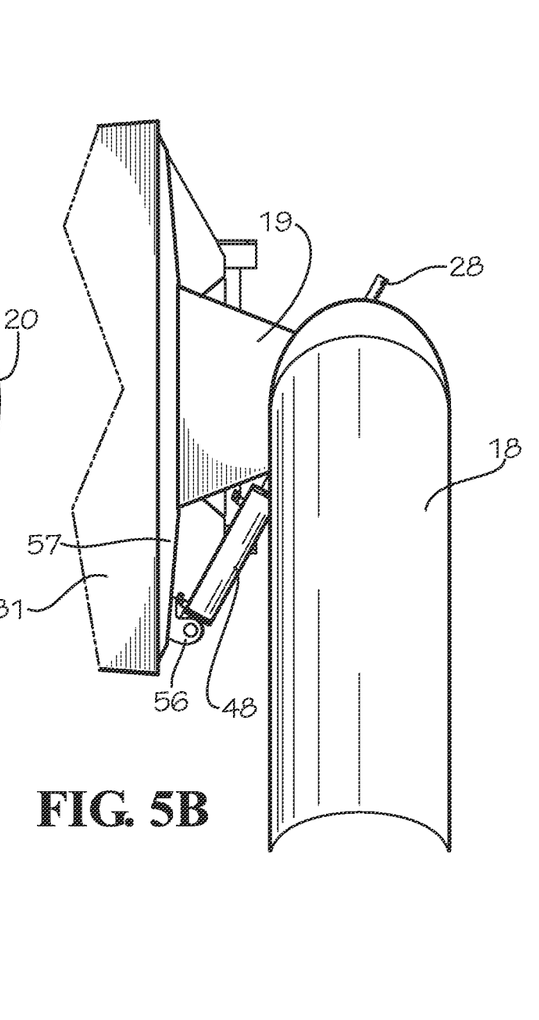
Figure 6A:
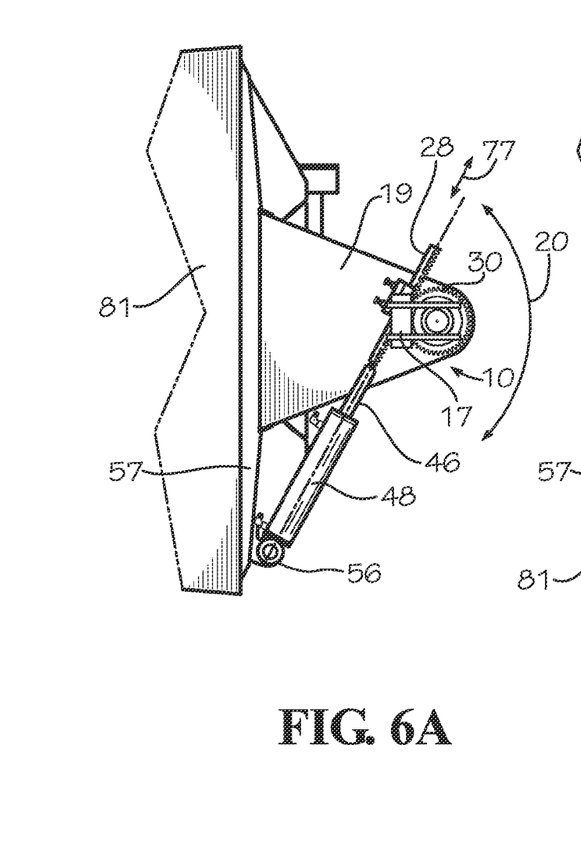
FIG. 6A illustrates a detailed top plan view of the mover apparatus in an intermediate position for orienting the cement chute in an intermediate angled position relative to the cement mixer as illustrated in FIG. 6B.
Figure 6B:
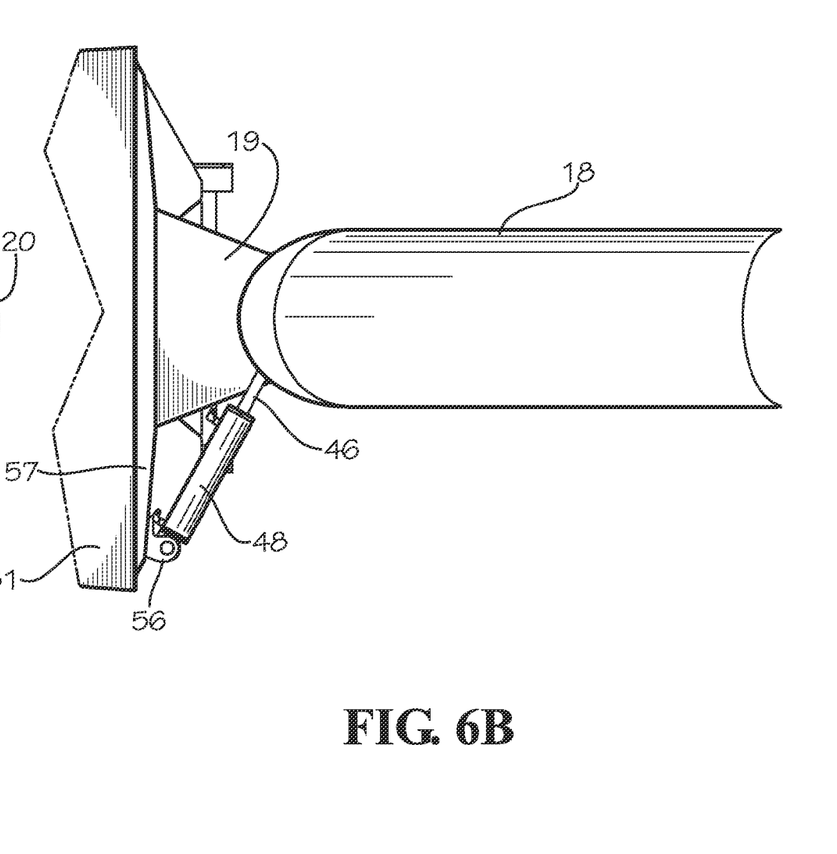

FIG. 5A illustrates a detailed top plan view of the mover apparatus 10 with the rack 28 disposed in an extended position (the cement chute 18 not illustrated for clarity) for orienting the cement chute 18 in a first angled position along the arc 20 relative to the cement mixer 14 as illustrated in FIG. 5B. The rack 28 moves longitudinally as indicated by the arrow 77 in response to operation of the hydraulic cylinder 48 to the extended position. The rack 28, guided in the U-channel 76, and in engagement with the pinion 30, causes the pivot mount 17 to rotate. As illustrated in FIG. 5B, the cement chute 18 is selectively moved to one side of the cement mixer, to the 180° position on the arc 20. (For illustrative purposes, the hydraulic mechanics—hoses 62, valve 64, supply 66 and controller 68—are not depicted in FIGS. 5A and 5B; FIGS. 6A and 6B; and 7A and 7B.)

FIG. 6A illustrates a detailed top plan view of the mover apparatus 10 with the rack 28 disposed in an intermediate position for orienting the cement chute 18 (not illustrated in FIG. 6A for clarity) in an intermediate angled position along the arc 20 relative to the cement mixer 14 as illustrated in FIG. 6B. With the hydraulic cylinder at a selected pressure loading, the cement chute may cease further horizontal movement, and be retained at that position for discharge of the cement mixture. The mover apparatus 10 thus brakes the cement chute from further movement as may occur under the loading of the cement chute by the cementatious mixture flowing therein.

Figure 7A:
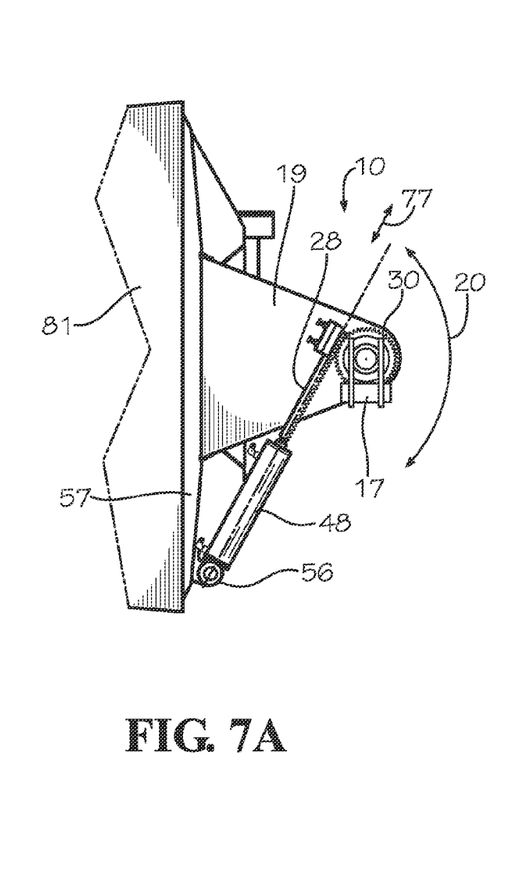
FIG. 7A illustrates a detailed top plan view of the mover apparatus in a retracted position for orienting the cement chute in a second angled position relative to the cement mixer as illustrated in FIG. 7B.
Figure 7B:
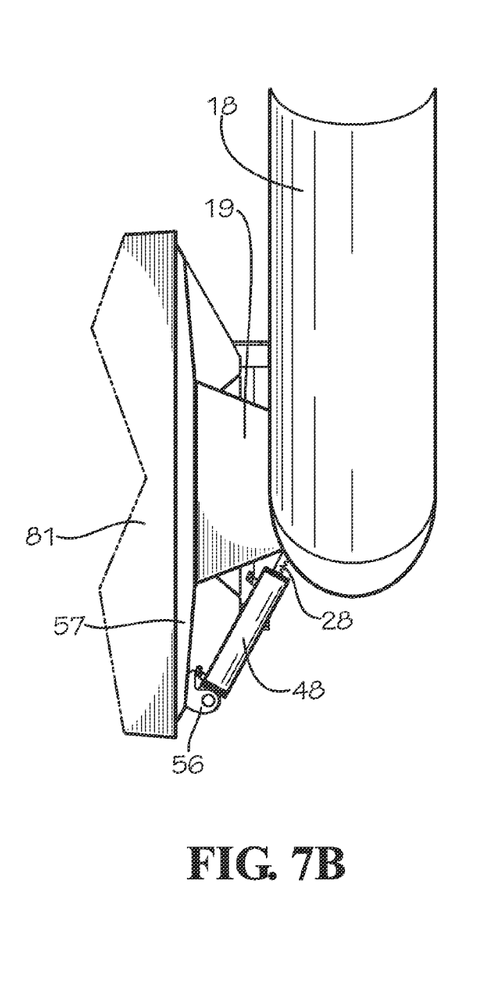

FIG. 7A illustrates a detailed top plan view of the mover apparatus 10 with the rack 28 disposed in a retracted position for orienting the cement chute 18 (not illustrated in FIG. 7A) in a second angled position relative to the cement mixer 14 as illustrated in FIG. 7B. The cement chute 18 is selectively moved to the opposing side of the cement mixer, to the 0° position on the arc 20.

The mover apparatus 10 readily installs on OEM cement mixer trucks, or other cement mixer devices that include the trough cement chute configured for pivoting in an arc relative to the discharge end. Further, the mover apparatus 10 may be provided as a kit of components for retro-fit installation on existing cement mixers having a manually horizontally-pivoted cement chute and utilizing hydraulic systems commonly existent for other purposes on cement mixer trucks. The kit includes at least the semi-circular members 38 to assemble the pinion 30, the rack 28 attached to the shaft of the hydraulic cylinder 48 as a mover assembly, the flanges 56, the guide assembly, and appropriate fasteners including the nut and bolt 60, the bolts 80 and lock nuts 82, and may include hydraulic hoses 62, valve 64, and control switch 86. The mover apparatus 10 readily installs as an aftermarket or OEM structure by persons with experience in hydraulic apparatus and machinery.

The controller 68 may be an electronic control panel having operation switches. In an alternate embodiment, the controller 69 is a wireless radio device communicating with a transceiver operatively engaged to valve 64 for operating the hydraulic cylinder 48. The wireless controller allows workers to stand away from the cement mixer 14 and the cement chute 18 while operating the mover apparatus 10 to selectively position the cement chute prior to and during discharge of the cementatious mixture flowing therein to the selected delivery location.

With reference to FIGS. 5A and 5B, FIGS. 6A and 6B, and 7A and 7B, the pivoting swinging movement of the formerly manually swung cement chute 18 may be observed. The cement chute 18 swings through the arc 20 from a first side position such as the 0° position shown in FIG. 7B, through an intermediate orientation (for example, as illustrated in FIG. 6B), to a second such as the 180° position opposing the first side. Upon selective orientation, the controller stops the motion, but the hydraulic cylinder 48 remains pressurized to hold the cement chute 18 in the selected position. The mover apparatus 10 thereby functions as a brake while the worker operating the cement chute 18 may stand remote and away from the moving cement chute. It is to be appreciated that the hydraulic cylinder 48 may be attached to the cement mixer conveniently, such as at a selected point along the structural portion 57, so long as the hydraulic cylinder occupies a horizontal plane for engagement of the rack 28 with the pinion 30. Thus, the angle of the longitudinal axis of the hydraulic cylinder relative to the structural portion 57 may differ from that shown based on the selected placement. Further, the hydraulic cylinder may be positioned in a horizontal plane relative to the pinion 30 in a selected vertical position between an upper end of the shaft 80 and a lower end of the shaft 80 as illustrated in FIG. 4 depicting the hydraulic cylinder disposed in a horizontal plane intermediate the opposing ends of the shaft.

It is thus seen that an apparatus is provided for selectively rotating a cement chute at the discharge end of a cement truck about a limited art for selectively positioning the of the chute in a limited arc relative to the truck at a job site for discharging the cement to a delivery location at a job site and sold as a kit may be readily installed, using common machine shop tools and equipment for servicing trucks and hydraulic system, as a retro-fit structure for mechanically moving the cement chute, to make placing concrete safer, easier and less time consuming and thereby providing an improved cycle time for placement of concrete at job sites. While this invention has been described in detail with particular reference to the preferred embodiments thereof, the principles and modes of operation of the present invention have been described in the foregoing specification. The invention is not to be construed as limited to the particular forms disclosed because these are regarded as illustrative rather than restrictive. Moreover, those skilled in the art may make modifications, variations and changes thereto without departure from the spirit and scope of the invention as described by the following claims.

What is claimed is:

1. A mover apparatus for swinging a cement chute pivotably mounted at a discharge end of a cement mixer, comprising:
    a pinion comprising at least a pair of arcuate members that each define a plurality of teeth on a face thereof and each arcuate member having respective opposing ends for attaching as a circular ring to a pivotable member that connects to the cement chute of the cement mixer, the arcuate members disposed with a respective end of a first one of the pair of arcuate members abutting a respective end of a second one of the pair of arcuate members;
    a mover assembly comprising a cylinder for attaching rigidly to the cement mixer and having an extendable shaft for moving between a retracted position and an extended position and an elongated rack that defines a plurality of teeth on a working face and attached at one end to the extendable shaft;
    a guide for mounting rigidly to a support for the pivotable member for biasing the teeth on the working face in engagement with the teeth of the pinion; and
    an operation device for operating the cylinder to move the extendable shaft between the retracted and the extended positions selectively,
    whereby, the pinion being engaged to the elongated rack, rotates in response to operation of the cylinder to move the elongated rack between the retracted and extended positions, to swing the cement chute in an arc relative to the cement mixer.

2. The mover apparatus as recited in claim 1, wherein the operation device comprises:
    a valve for communicating with a supply of hydraulic fluid;
    a first hydraulic flow line for connecting between the cylinder and the valve;
    a second hydraulic flow line for connecting between the valve and the supply of hydraulic fluid; and
    a switch to operate the valve selectively for retracting or extending the extendable shaft.

3. The mover apparatus as recited in claim 1, wherein the guide comprises:
    a U-channel member that slidingly receives the elongated rack for longitudinal movement during operation of the cylinder;

a backer plate that abuts a back face of the U-channel member;

a flange extending normal to the backer plate for rigidly attaching to the support for the pivotable member; and connectors that extend through the backer plate and against the U-channel member to bias the teeth of the elongated rack in engagement to the teeth of the pinion.

4. The mover apparatus as recited in claim 3, wherein the backer plate defines a pair of threaded openings; and the connectors comprise a pair of bolts, each for extending threadingly through a respective one of the openings to bear against the U-channel member; and further comprising a pair of lock nuts, each received on a respective one of the bolts for threadingly tightening against the backer plate, for retaining the elongated rack biased in engagement to the pinion.

5. The mover apparatus as recited in claim 1, wherein the cylinder comprises a hydraulic cylinder that communicates through a pump with a hydraulic fluid supply for operating the cylinder to move the extendable shaft between the retracted position and the extended position.

6. The mover apparatus as recited in claim 1, further comprising:

a support housing for holding a rotatable shaft to which the pivotable member connects;

the pinion rigidly attached to the rotatable shaft within the support housing;

a slot defined in a sidewall of the support housing; and the elongated rack received through the slot inwardly of the support housing for engaging the pinion.

7. A method of retrofitting a manually swung cement chute of a cement mixer with a mover assembly, comprising the steps of:

(a) rigidly attaching an arcuate pinion member having a plurality of teeth to a pivot mount that connects to the cement chute of the cement mixer, the arcuate pinion member defined by a first arcuate member and a second arcuate member disposed with respective ends in abutting relation;

(b) engaging a rack having a plurality of teeth to the arcuate pinion member, which rack attaches to a power device that being operated moves the rack longitudinally between an extended position and a retracted position and thereby imparting rotational movement to the arcuate pinion member;

(c) securing the power device to a support on the cement mixer; and (d) connecting the power device to a power source and to an operational controller for selectively moving the rack, wherein the pivot mount rotates upon longitudinal movement of the rack during selective operation by the operational controller.

8. The method as recited in claim 7 further comprising the step of guiding the engagement of the rack and the arcuate pinion member with a backer plate mounted to the support for biasing the rack into engagement with the arcuate pinion member.

9. The method as recited in claim 7, wherein the first arcuate member and the second arcuate member are semi-circular and disposed in opposing relation.

10. A mover apparatus for swinging a cement chute pivotably mounted at a discharge end of a cement mixer, comprising:

a pinion defining a plurality of teeth on a face of the pinion, the pinion for attaching to a pivotable member that connects to the cement chute of the cement mixer;

a mover assembly comprising a cylinder for attaching rigidly to the cement mixer and having an extendable shaft for moving between a retracted position and an extended position and an elongated rack that defines a plurality of teeth on a working face and attached at one end to the extendable shaft;

a guide for mounting rigidly to a support for the pivotable member for biasing the teeth on the working face in engagement with the teeth of the pinion, the guide comprising:

a U-channel member that slidingly receives the elongated rack for longitudinal movement during operation of the cylinder;

a backer plate that abuts a back face of the U-channel member;

a flange extending normal to the backer plate for rigidly attaching to the support for the pivotable member; and connectors that extend through the backer plate and against the U-channel member to bias the teeth of the elongated rack in engagement to the teeth of the pinion; and an operation device for operating the cylinder to move the extendable shaft between the retracted and the extended positions selectively, whereby, the pinion being engaged to the elongated rack, rotates in response to operation of the cylinder to move between the retracted and extended positions, to swing the cement chute in an arc relative to the cement mixer.

11. The mover apparatus as recited in claim 10, wherein the pinion comprises at least a pair of arcuate members, each arcuate member having respective opposing ends and a respective end of a first one of the pair of arcuate members abutting an end of a second one of the pair of arcuate members when attached to the pivotable member.

12. The mover apparatus as recited in claim 10, wherein the pinion comprises an arcuate member.

13. The mover apparatus as recited in claim 10, wherein the operation device comprises:

a valve for communicating with a supply of hydraulic fluid;

a first hydraulic flow line for connecting between the cylinder and the valve;

a second hydraulic flow line for connecting between the valve and the supply of hydraulic fluid; and a switch to operate the valve selectively for retracting or extending the extendable shaft.

14. The mover apparatus as recited in claim 10, wherein the backer plate defines a pair of threaded openings; and the connectors comprise a pair of bolts, each for extending threadingly through a respective one of the openings to bear against the U-channel member; and further comprising a pair of lock nuts, each received on a respective one of the bolts for threadingly tightening against the backer plate, for retaining the elongated rack biased in engagement to the pinion.

15. The mover apparatus as recited in claim 10, wherein the cylinder comprises a hydraulic cylinder that communicates through a pump with a hydraulic fluid supply for operating the cylinder to move the extendable shaft between the retracted position and the extended position.

16. The mover apparatus as recited in claim 10, further comprising:

a support housing for holding a rotatable shaft to which the pivotable member connects;

the pinion rigidly attached to the rotatable shaft within the support housing;

a slot defined in a sidewall of the support housing; and
the elongated rack received through the slot inwardly of the support housing for engaging the pinion.

17. A mover apparatus for swinging a cement chute pivotably mounted at a discharge end of a cement mixer, comprising:
   a support housing defining a slot in a sidewall and for holding a rotatable shaft for connecting to a pivotable member that connects to the cement chute of the cement mixer;
   a pinion defining a plurality of teeth on a face of the pinion, the pinion for attaching to the rotatable shaft;
   a mover assembly comprising a cylinder for attaching rigidly to the cement mixer and having an extendable shaft for moving between a retracted position and an extended position and an elongated rack that defines a plurality of teeth on a working face and attached at one end to the extendable shaft, the elongated rack received through the slot inwardly of the support housing for engaging the pinion;
   a guide for mounting rigidly to a support for biasing the teeth on the working face in engagement with the teeth of the pinion; and
   an operation device for operating the cylinder to move the extendable shaft between the retracted and the extended positions selectively;
   whereby, the pinion being engaged to the elongated rack, rotates in response to operation of the cylinder to move the elongated rack between the retracted and extended positions, to swing the cement chute in an arc relative to the cement mixer.

18. A mover apparatus for swinging a cement chute pivotably mounted at a discharge end of a cement mixer, comprising:
   a pinion comprising at least a pair of arcuate members that each define a plurality of teeth on a face thereof for attaching to a pivotable member that connects to the cement chute of the cement mixer with a first end of one of the pair of arcuate members abutting a first end of a second one of the pair of arcuate members;
   a mover assembly comprising a cylinder for attaching rigidly to the cement mixer and having an extendable shaft for moving between a retracted position and an extended position and an elongated rack that defines a plurality of teeth on a working face and attached at one end to the extendable shaft;
   a guide for mounting rigidly to a support for the pivotable member for biasing the teeth on the working face in engagement with the teeth of the pinion; and
   an operation device for operating the cylinder to move the extendable shaft between the retracted and the extended positions selectively,
   whereby, the pinion being engaged to the elongated rack, rotates in response to operation of the cylinder to move the elongated rack between the retracted and extended positions, to swing the cement chute in an arc relative to the cement mixer.

19. The mover apparatus as recited in claim 18, wherein the guide comprises:
   a U-channel member that slidingly receives the elongated rack for longitudinal movement during operation of the cylinder;
   a backer plate that abuts a back face of the U-channel member and defining a plurality of openings therethrough;
   a flange extending normal to the backer plate for rigidly attaching to the support for the pivotable member; and
   a plurality of connectors that each extends through a respective opening in the backer plate and against the U-channel member to bias the teeth of the elongated rack in engagement to the teeth of the pinion.

20. The mover apparatus as recited in claim 18, further comprising:
   a support housing for holding a rotatable shaft to which the pivotable member connects;
   the pinion rigidly attached to the rotatable shaft within the support housing;
   a slot defined in a sidewall of the support housing; and
   the elongated rack received through the slot inwardly of the support housing for engaging the pinion.

* * * * *